United States Patent
Fukuchi

(10) Patent No.: US 7,057,986 B2
(45) Date of Patent: Jun. 6, 2006

(54) RECORDING STOP PROCESSING METHOD AND DATA RECORDING APPARATUS

(75) Inventor: Katsumi Fukuchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 461 days.

(21) Appl. No.: 10/408,128

(22) Filed: Apr. 8, 2003

(65) Prior Publication Data

US 2003/0210623 A1   Nov. 13, 2003

(30) Foreign Application Priority Data

May 8, 2002   (JP)   ............................. 2002-133108

(51) Int. Cl.
*G11B 5/09*   (2006.01)
(52) U.S. Cl. .............................. 369/47.31; 369/47.34; 386/111; 386/112
(58) Field of Classification Search ............. 369/47.31, 369/47.34; 386/111, 112
See application file for complete search history.

(56) References Cited

U.S. PATENT DOCUMENTS 5,343,451 A * 8/1994 Iizuka ..................... 369/30.19
5,754,730 A * 5/1998 Windrem et al. ........... 386/124
6,426,771 B1 * 7/2002 Kosugi ..................... 348/222.1
6,807,363 B1 * 10/2004 Abiko et al. ................ 386/68

FOREIGN PATENT DOCUMENTS

| JP | 05-189872 | 7/1993 |
| JP | 06-044687 | 2/1994 |
| JP | 11-110915 | 4/1999 |
| JP | 2001-320657 | 11/2001 |

OTHER PUBLICATIONS

Japanese Office Action dated Jan. 17, 2006 for Appln. No. 2002-133108.

* cited by examiner

*Primary Examiner*—Gautam R. Patel
*Assistant Examiner*—Van Pham
(74) *Attorney, Agent, or Firm*—Pillsbury Winthrop Shaw Pittman, LLP

(57) ABSTRACT

In a recording stop processing method according to an aspect of this invention, when a recording stop instruction is input and the data size of stream data, which is stored in a storage destination, is smaller than the predetermined data size, dummy data is added to the stream data stored in the storage destination, and the stream data with the dummy data, whose data size becomes equal to the predetermined data size, is DMA-transferred to terminate DMA transfer, thus stopping recording of stream data.

12 Claims, 9 Drawing Sheets

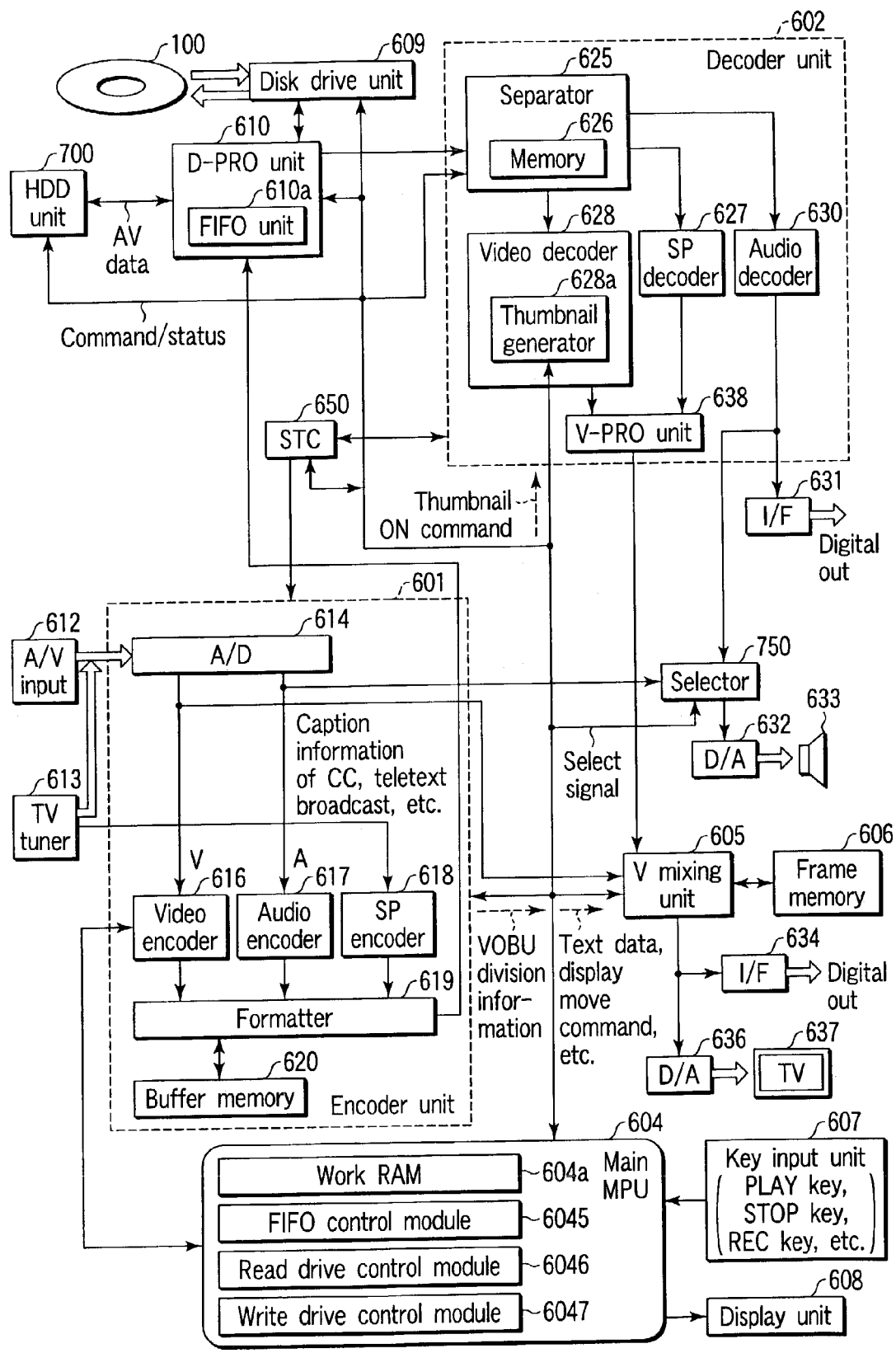
F I G. 1

RECORDING STOP PROCESSING METHOD AND DATA RECORDING APPARATUS

CROSS-REFERENCE TO RELATED APPLICATIONS

This application is based upon and claims the benefit of priority from the prior Japanese Patent Application No. 2002-133108, filed May 8, 2002, the entire contents of which are incorporated herein by reference.

BACKGROUND OF THE INVENTION

1. Field of the Invention

The present invention relates to a recording stop processing method upon recording stream data transferred by DMA (Direct Memory Access). The present invention also relates to a data recording apparatus for recording stream data transferred by DMA.

2. Description of the Related Art

A recording apparatus that records stream data of, e.g., a video stream, temporarily stores stream data in a buffer, DMA-transfers the stored stream data, and records the stream data in a hard disk or optical disk.

Even when a recording stop instruction is issued during recording of stream data, recording cannot be immediately stopped unless DMA transfer terminates normally.

BRIEF SUMMARY OF THE INVENTION (1) A recording stop processing method according to an aspect of the present invention comprises:

terminating, when a recording stop instruction is input, while stream data, which is provided in response to a recording instruction, is stored in a predetermined storage destination, the stored stream data is DMA-transferred for each predetermined data size, the DMA-transferred stream data is recorded in a predetermined recording destination, and a data size of the stream data stored in the recording area at that time is smaller than the predetermined data size, DMA transfer by adding dummy data to the stream data stored in the storage destination and DMA-transferring the stream data with the dummy data, the data size of which becomes equal to the predetermined data size, thereby stopping recording of stream data.

(2) A data recording apparatus according to an aspect of the present invention comprises: a storage unit configured to store stream data which is provided in response to a recording instruction; a transfer unit configured to DMA-transfer the stream data stored in the storage unit for each predetermined data size; a recording unit configured to record the stream data, which is DMA-transferred by the transfer unit; and a control unit configured to terminate, when a recording stop instruction is input while stream data is recorded by the recording unit, and a data size of the stream data stored in the storage unit is smaller than the predetermined data size, DMA transfer, by adding dummy data to the stream data stored in the storage unit, and DMA-transferring the stream data with the dummy data, the data size of which becomes equal to the predetermined data size, thereby stopping recording of stream data.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram for explaining the overall arrangement of a digital video recording/playback apparatus (DVD video recorder) with an HDD according to an embodiment of the present invention;

DETAILED DESCRIPTION OF THE INVENTION

Figure 2:
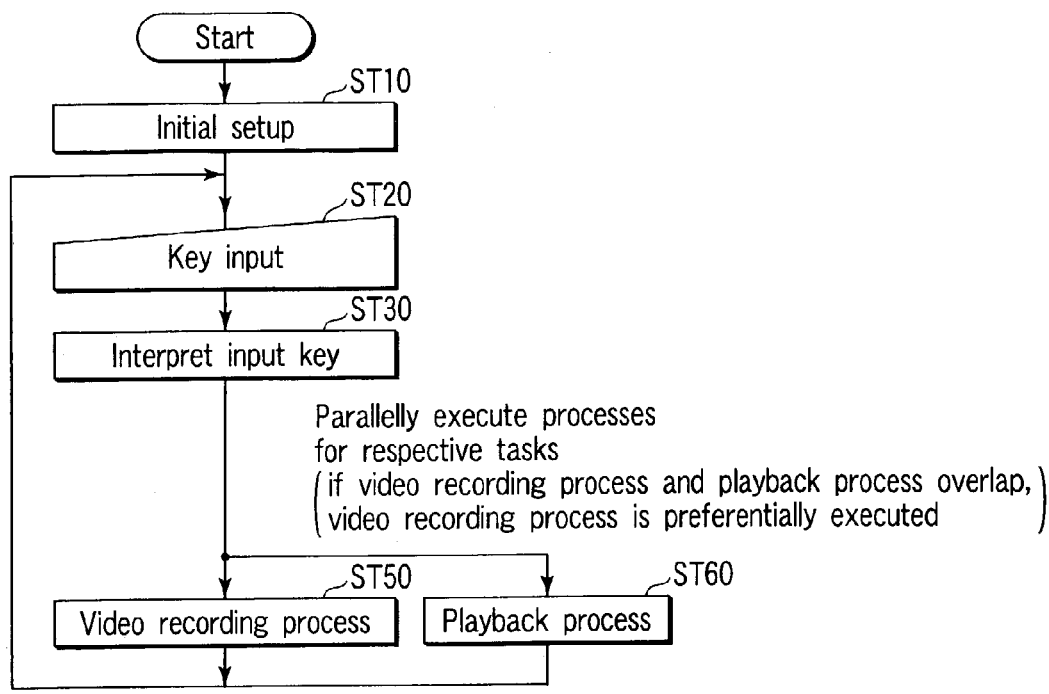
FIG. 2 is a flow chart for explaining the overall operation of the apparatus shown in FIG. 1.

A digital video recording/playback apparatus (DVD-RTR recorder) according to an embodiment of the present invention will be described hereinafter with reference to the accompanying drawings.

FIG. 1 is a block diagram for explaining the overall arrangement of a digital video recording/playback apparatus (DVD video recorder) with a hard disk drive HDD according to an embodiment of the present invention. This apparatus basically performs real-time video recording using a recordable optical disk (DVD-RAM disk, DVD-RW disk, DVD-R disk, or the like) 100 and/or a hard disk, and also has a playback function of a read-only optical disk (DVD-ROM disk, recorded DVD-R disk). Also, this apparatus has a function of implementing time slip viewing, using the high-speed access performance of the HDD and a DVD-RAM drive. Time slip viewing is a function of playing back a program or the like while video recording is in progress.

The apparatus shown in FIG. 1 comprises an encoder unit 601, decoder unit 602, main MPU (microcomputer; or central processing unit (CPU)) 604, V (video) mixing unit 605, frame memory 606, key input unit 607, display unit 608, DVD-RAM (and/or DVD-R/DVD-RW) drive unit 609, D-PRO (data processor) unit 610, A/V input 612, TV tuner (BS/terrestrial analog tuner) 613, audio digital I/F 631, audio D/A unit 632, loudspeaker 633 (an audio amplifier used to drive that loudspeaker is not shown), video digital I/F 634, TV D/A unit 636, external monitor TV 637, STC (system time counter) unit 650, HDD unit (e.g., an HDD recorder unit of around 20 GB to 100 GB and/or a large-capacity IC memory) 700, audio signal selector unit 750, and the like.

The D-PRO unit 610 comprises an internal or external FIFO (first-in, first-out) unit (FIFO buffer) 610a of a FIFO format. The FIFO buffer which forms this FIFO unit 610a includes a recording FIFO and playback FIFO. I/O control and the remaining amount monitor of these recording and playback FIFOs are implemented by a control program named a FIFO control module 6045 written in a program ROM in the main MPU 604.

The recording and playback FIFOs are obtained by, e.g., proportionally dividing one FIFO buffer in accordance with the ratio between recording data and playback data. Hence, even when the total FIFO buffer size is constant, the sizes of the individual recording and playback FIFOs are variable. For example, if the FIFO buffer size is 4 MB, and the recording rate is three times the playback rate, a 3 MB buffer size can be assigned to the recording FIFO, and a 1 MB buffer size can be assigned to the playback FIFO. If the rates have changed during recording/playback, and for example, the recording rate becomes ⅓ the playback rate, the buffer size of the recording FIFO can be reduced to 1 MB, and that of the playback FIFO can be increased to 3 MB. As a method of changing the proportional distribution ratio of the recording and playback FIFOs of the FIFO buffer in accordance with the rates, the following method is available. That is, an address pointer is set at the boundary between the recording and playback FIFOs, and this address pointer position is changed in accordance with the recording/playback rate, thus changing the proportional distribution ratio of the recording and playback FIFOs of the FIFO buffer.

If the FIFO buffer size is sufficiently large (e.g., 16 MB), the sizes of the recording and playback FIFOs may be fixed (e.g., 8 MB each).

Read control from the disk drive unit 609 (or HDD unit 700) is implemented by a control program named a read drive control module 6046 written in the program ROM in the main MPU 604. Also, write control to the disk drive unit 609 (or HDD unit 700) is implemented by a control program named a write drive control module 6047 written in the program ROM in the main MPU 604.

The main MPU 604 incorporates a ROM which includes the aforementioned control programs (firmware) and other control parameters, and a work RAM 604a used upon execution of each program. Note that the work RAM 604 includes a memory area named a VMG holding field (not shown) that temporarily stores management information (RTR_VMG) shown in FIG. 8.

The encoder unit 601 includes an A/D unit 614, a video encoder 616, an audio encoder 617 including a dual/mono header setting unit 617a, an SP (sub-picture) encoder 618, a formatter 619, and a buffer memory 620. The decoder unit 602 includes a separator 625 that incorporates a memory 626, a video decoder 628 that incorporates a reduced-scale image (thumbnail) generator 628a, an SP (sub-picture) decoder 627, an audio decoder 630, and a V-PRO (video processor) unit 638.

Video recording (recording of AV information) is attained by the disk drive unit (DVD-RAM drive unit) using an exchangeable (removable) DVD-RAM (or DVD-R/DVD-RW) disk 100 via the encoder unit 601. This disk drive unit 609 can play back not only a DVD-RAM (or DVD-R/DVD-RW) disk 100 but also a DVD video (or DVD-ROM) disk 100. That is, DVD-family disks are played back via the disk drive unit 609, D-PRO unit 610, and decoder unit 602. The functions upon DVD video playback can be basically the same as those of a commercially available DVD video player.

The flow of an actual video signal in the apparatus shown in FIG. 1 is as follows. An AV (audio/visual) signal obtained from the TV tuner 613 is input to the A/D unit 614, and is converted into a digital signal. The converted digital signal is input to the video encoder 616, and a digital audio signal is input to the audio encoder 617.

If text data of, e.g., teletext broadcast is output from the TV tuner 613 upon reception/video recording of terrestrial analog broadcast, such text data is input to the SP (sub-picture) encoder 618. Upon reception/video recording of terrestrial analog broadcast, an input video signal is temporarily converted into a digital signal by the A/D unit 614, and the digital signal is compressed by MPEG in the video (main picture) encoder 616. Also, an input audio signal is compressed by, e.g., MPEG audio in the audio encoder 617. Furthermore, input text data is compressed by runlength coding in the SP encoder 618.

The encoders 616 to 618 packetize data to form 2048 bytes if packets are packed, and input packetized signals (video data, audio data, and sub-picture data) to the formatter 619. The formatter 619 packs and multiplexes input packet data using the buffer memory 620 as needed, and sends multiplexed signals (video pack, audio pack, and sub-picture pack) to the D-PRO unit 610.

The D-PRO unit 610 forms an ECC block for every 16 packs/16 sectors in current DVD video (32 packs/32 sectors or more in next-generation DVD video), and appends error correction data to that block. The disk drive unit 609 records a data stream obtained in this way on an optical disk (DVD-RAN, DVD-RW, or DVD-R) 100 or in the HDD unit 700. If the disk drive unit 609 is busy since it is seeking or makes a track jump or the like, recording data may be temporarily stored in the HDD unit 700 (and/or a semiconductor memory (not shown)) to wait until the disk drive unit 609 is ready to record data.

Furthermore, the formatter 619 generates each separation information during video recording (in response to, e.g., a GOP start interrupt or the like), and periodically sends the generated separation information to the MPU 604. The separation information includes the number of packs in a VOBU (video object unit) as a data access unit, the end address of I-picture counted from the beginning of the VOBU, a VOBU playback time, and the like. Each VOBU can contain the aforementioned video packs, audio packs, and/or sub-picture packs. The disk drive unit 609 can access information recorded on a disk 100 to have a VOBU as a unit. Note that one video file is recorded per disk according to DVD-RTR (real-time video recording/playback DVD).

Various operations of the apparatus shown in FIG. 1 will be explained below with reference to the flow charts. FIG. 2 is a flow chart for explaining the overall operation of the apparatus shown in FIG. 1. Respective processes in this flow chart are controlled by the main MPU 604 in FIG. 1. The main MPU 604 executes a predetermined initial setup process (ST10) after the apparatus is started up. The main MPU 604 then waits for a user's key input (a key input from a remote controller (not shown) or an operation command from a video recording reservation program). Upon detection of the key input (ST20), the main MPU 604 interprets that key input (a switching command of a TV reception channel, video recording start command, playback start command, or the like) (ST30).

For example, if the interpretation result of the input key is a "video recording start command" during video recording, a video recording process on a recordable optical disk (DVD-RAM disk or the like) 100 loaded in the disk drive unit 609 and/or the HDD unit 700 is executed (ST50).

For example, if the interpretation result of the input key is a "playback start command" during playback, a playback process from an optical disk (DVD-RAM disk, DVD-RW disk, DVD-R disk, or DVD video disk) 100 loaded in the disk drive unit 609 is executed (ST60).

In the processes shown in FIG. 2, if the recording process on the disk 100 (or HDD unit 700) overlaps the playback process from the disk 100 (or HDD unit 700), the control unit (604) preferentially executes the recording process on the disk 100 (or HDD unit 700) (ST60 in FIG. 2 is executed in preference to ST50).

Figure 3:
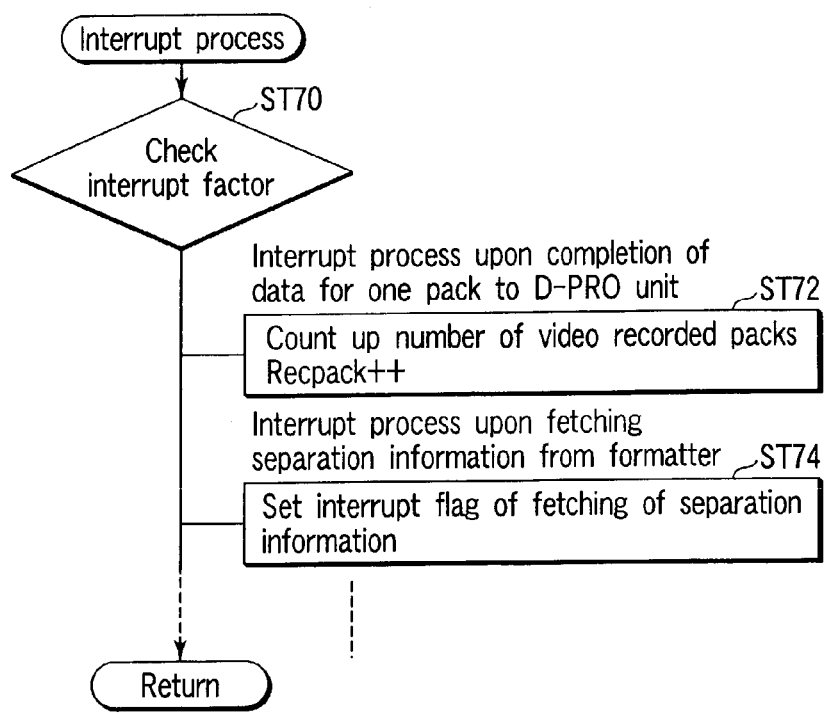
FIG. 3 is a flow chart for explaining an interrupt process in the apparatus shown in FIG. 1.

FIG. 3 is a flow chart for explaining an interrupt process in the apparatus shown in FIG. 1. If the control enters the interrupt process, since there are various interrupt factors, an interrupt factor is checked first (ST70). If the interrupt factor is, e.g., an "interrupt process upon completion of transfer for one pack to the D-PRO unit 610", an interrupt process Recpack++ (ST72) for counting up the number of video recorded packs is executed. On the other hand, if the interrupt factor is, e.g., an "interrupt process upon fetching separation information from the formatter 619", an interrupt flag for fetching of separation information is set (ST74). Although not shown, an interrupt flag for fetching of separation information x (x=1, 2, 3, . . . ) is set as needed. After the interrupt processes for various interrupt factors are done, the control returns to the flow of other processes.

Figure 4:
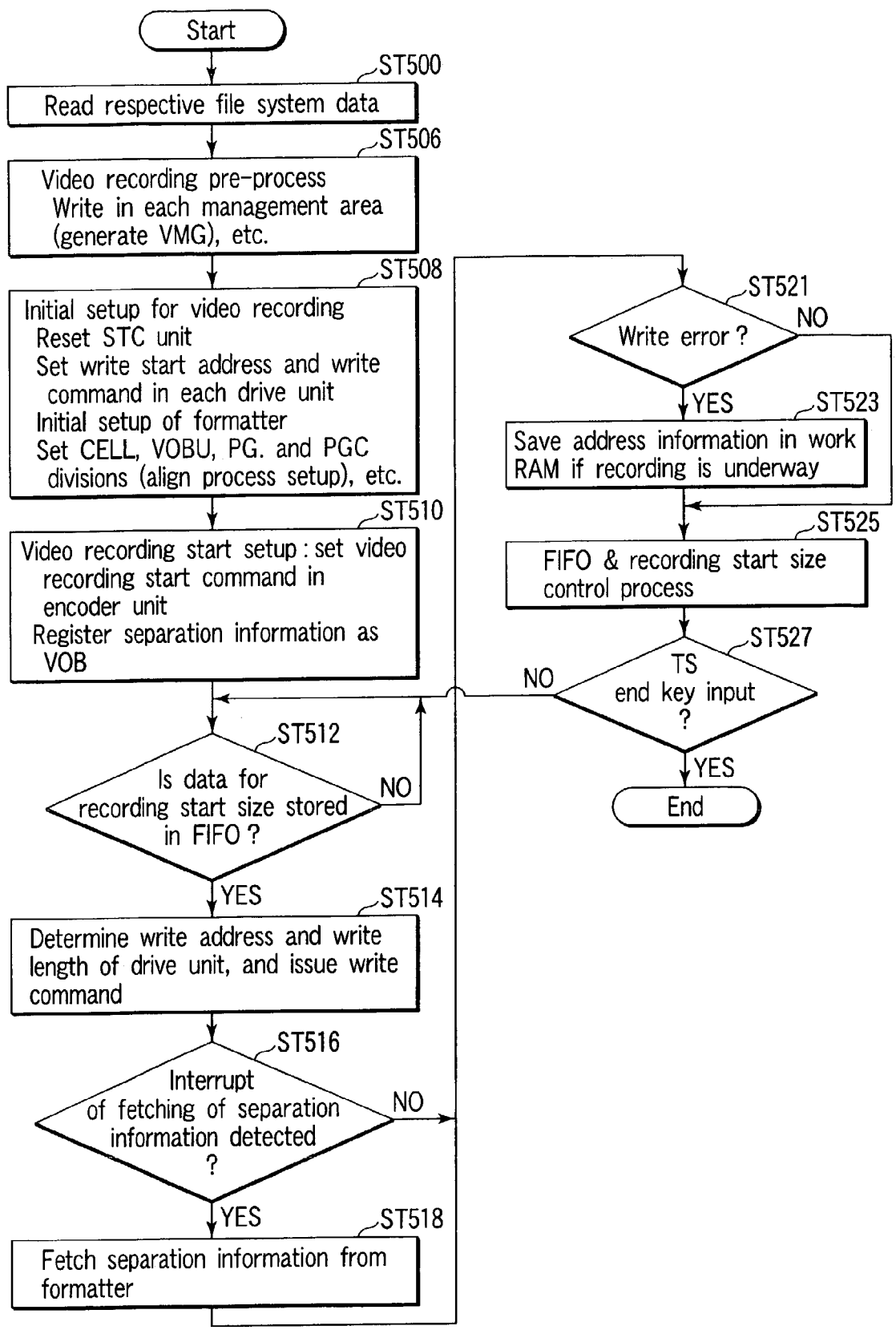
FIG. 4 is a flow chart for explaining a video recording process in the apparatus shown in FIG. 1.

FIG. 4 is a flow chart for explaining a video recording process (recording of an MPEG program stream PS) in the apparatus shown in FIG. 1. The main MPU 604 reads respective file system data from a disk 100 loaded in the disk drive unit 609 (or HDD unit 700) (ST500). The main MPU 604 calculates the used disk size based on the read data, and checks if that disk 100 (or HDD unit 700) has a free space. If no free space is available, the main MPU 604 displays a warning message "no video recording space is available" or the like on the display unit 608 or TV 637, thus ending the process. If a free space is available, the main MPU 604 reads a management file (VMG file) from the disk 100 (or HDD unit 700). If no management file is found, the main MPU 604 generates a new VMG file, and maps it in the RAM 604a (ST506).

After such a video recording pre-process (ST506), the main MPU 604 starts a video recording initial setup process (ST508). In this video recording initial setup process, the main MPU 604 resets the STC unit 650, and sets a write start address and write command in each drive unit (disk drive 609, HDD unit 700, and the like). Also, the MPU 604 makes the initial setups of the formatter 619 (setups of divisions of cells (CELL), video object units (VOBU), programs (PG), and a program chain (PGC)), and so forth. After the initial setup process, the MPU 604 executes a video recording start setup process (ST510). In this video recording start setup process, the MPU 604 sets a video recording start command in the encoder unit 601, and registers the separation information (divisions set in ST508) as video objects (VOB).

After the beginning of video recording, if data for a recording start size (e.g., one ECC block or more) have been stored in the FIFO unit 610a (YES in ST512), the MPU 604 determines a write address and write length in the disk drive unit 609 (or HDD unit 700), and issues a write command to the disk drive unit 609 (or HDD unit 700) (ST514). Upon detection of a fetching interrupt of separation information (YES in ST516), the MPU 604 fetches separation information from the formatter 619 (ST518).

In other words, if the FIFO buffer of the FIFO unit 610a has stored a given size (for one or more ECC blocks or one continuous data area CDA) of data of a program stream (PS) fetched in the encoder unit 601 (YES in ST512), the stored data is recorded on the disk 100 (or HDD unit 700). At this time, the separation information of the recorded data is fetched in the work RAM 604a as needed (ST518).

If any write error to the disk 100 (or HDD unit 700) has occurred during write access (video recording) that has started in response to the write command issued in ST514 (YES in ST521), the MPU 604 temporarily saves address information where recording is underway in the work RAM 604a (ST523), and then starts a FIFO & recording start size control process (ST525). The address information temporarily saved in the work RAM 604a can be recorded in a volume & file management information area (see the first column b in FIG. 8) in the disk 100 as needed after the end of recording. If no write error has occurred (NO in ST521), the MPU 604 skips the process in ST523, and starts a FIFO & recording start size control process (ST525).

While video recording continues (NO in ST527), the processes in ST512 to ST527 are repeated. If a video recording end key input is detected, and video recording comes to an end (YES in ST527), the MPU 604 executes a video recording end process (not shown). In this video recording end process, the MPU 604 can fetch and initialize the remaining separation information from the formatter 619, and can write the setups of program chain information (PGCI) (separation information, I-picture information, and the like) in management information VMG. In other words, the MPU 604 fetches the remaining separation information in the work RAM 604a, and can update the contents of the management information VMG on the basis of the fetched separation information.

Figure 5:
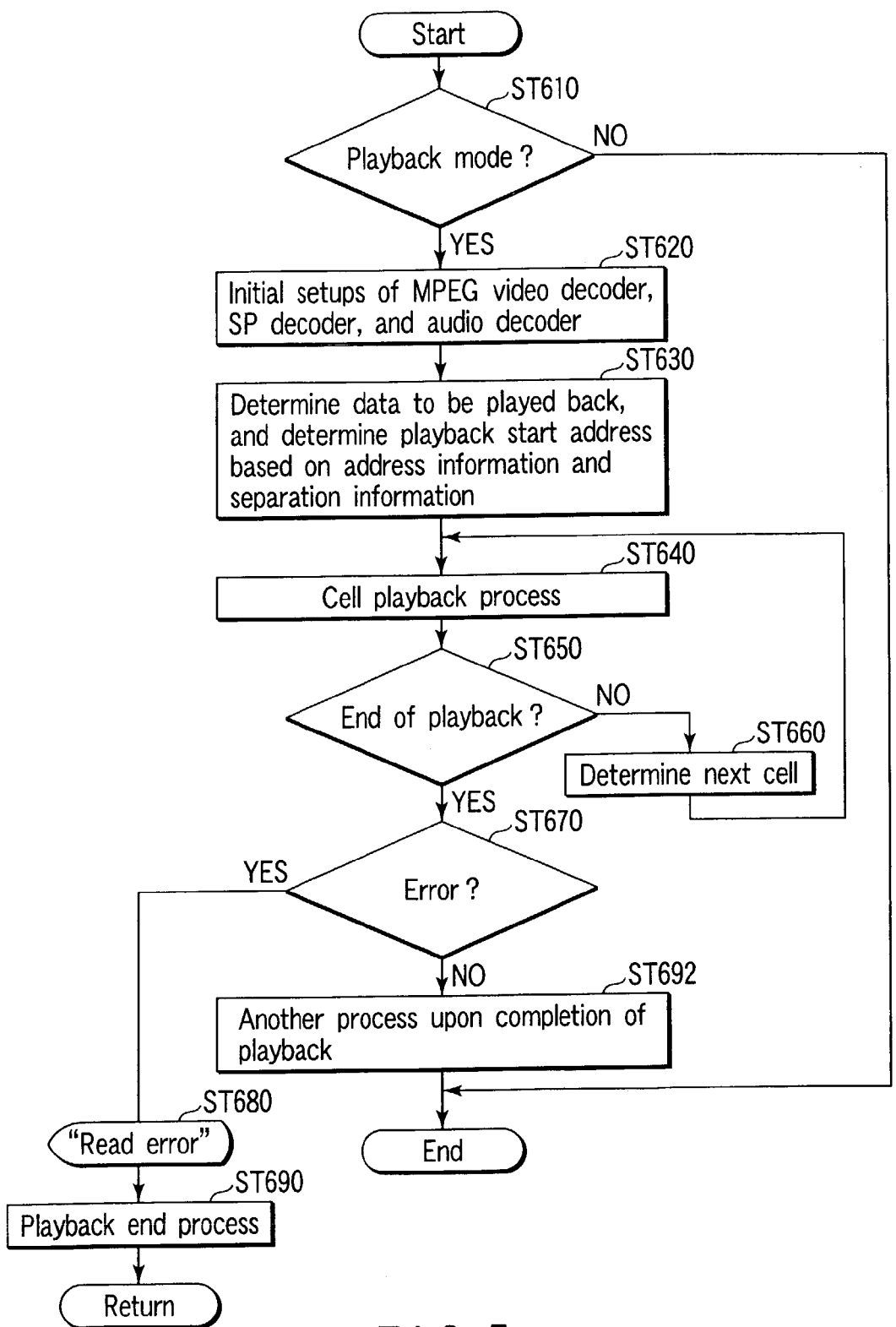
FIG. 5 is a flow chart for explaining a playback process in the apparatus shown in FIG. 1.

FIG. 5 is a flow chart for explaining processes executed when the digitally recorded video information is played back by the apparatus shown in FIG. 1. The following description will be given under the assumption that video information is normally recorded on the disk 100 loaded in the disk drive unit 609 (the same applies to playback from the HDD unit 700).

It is checked if the current mode is a playback mode (ST610). If the current mode is not a playback mode (NO in ST610), the process in FIG. 5 ends. If the current mode is a playback mode (YES in ST610), the MPU 604 executes initial setups of the MPEG video decoder 628, sub-picture (SP) decoder 627, and audio decoder 630 (ST620).

Upon completion of the initial setups, the MPU 604 determines data to be played back on the basis of, e.g., the playback time of user's choice, and determines a playback start address on the basis of address information and separation information corresponding to the determined data (ST630). After the playback start address is determined, the MPU 604 executes a cell playback process (ST640). During playback (NO in ST650), the MPU 604 executes the cell playback process (ST640) while determining the next cell to be played back (ST660).

Upon completion of cell playback (YES in ST650), the MPU 604 executes an error check process (ST670). If any error has occurred upon completion of playback (YES in ST670), the MPU 604 displays a message "read error has occurred" on the display unit 608 and/or TV 637 (ST680), and executes a playback end process (ST690). The control then returns to another process state (e.g., a key input wait state in ST20 in FIG. 2). If no error has occurred (NO in ST670), the MPU 604 executes another process upon completion of playback (ST692), thus ending the playback process in FIG. 5.

Figure 6:
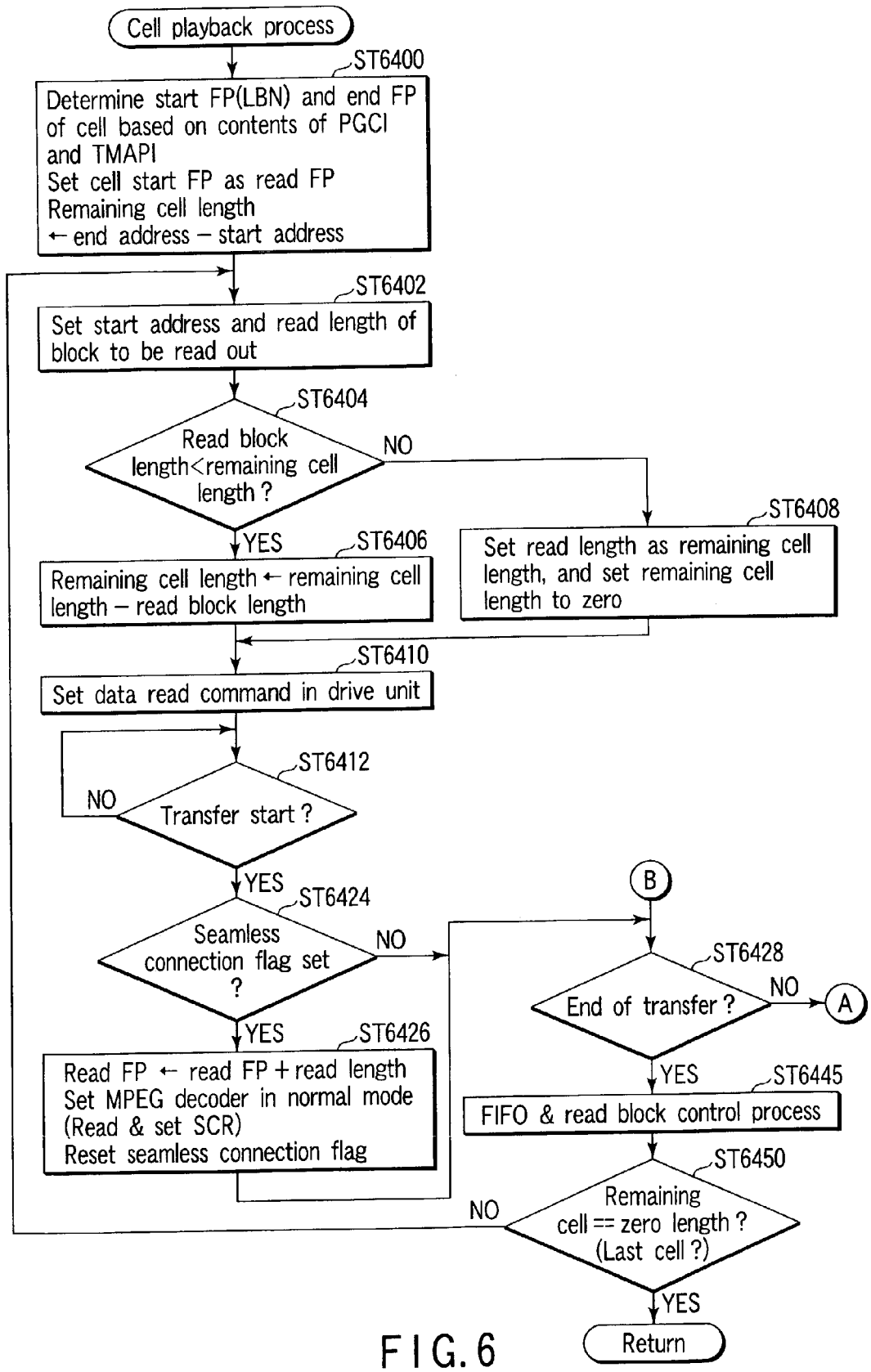
FIG. 6 is a flow chart for explaining the contents (part 1) of a process executed upon cell playback in the process shown in FIG. 5.

FIG. 6 is a flow chart for explaining the contents of the cell playback process (ST640) in the process in FIG. 5. FIG.

7 is a flow chart for explaining the remaining steps of the process in FIG. 6. In ST6400 in FIG. 6 and the like, "FP" indicates the head position, and LBN indicates the logical block number. For example, the start FP(LBN) of a playback designates the head position of a cell from which playback is to start using the logical block number.

The MPU 604 determines the start FP(LBN) and end FP(LBN) of a cell to be played back on the basis of program chain information PGCI and time map information TMAPI contained in the management information VMG, and sets the cell start FP as the read FP and "end address–start address" as a remaining cell length (ST6400). The MPU 604 sets the start address and read length of a data block (continuous data area CDA) to be read out (ST6402). If the read block length is shorter than the remaining cell length (YES in ST6404), the MPU 604 sets "remaining cell length–read block length) as the remaining cell length (ST6406). On the other hand, if the read block length is equal to or longer than the remaining cell length (NO in ST6404), the MPU 604 sets the read block length as the remaining cell length, and sets the remaining cell length to zero (ST6408).

Subsequently, the MPU 604 sets a data read command in the disk drive unit 609 (ST6410), and waits for the start of transfer of data to be read out. If transfer starts (YES in ST6412), the MPU 604 waits until data to be read out for one VOBU or more are stored in the FIFO buffer. If data for one VOBU or more is stored in the FIFO buffer, the MPU 604 reads data for one VOBU from this buffer, and checks packs which form this VOBU.

If a seamless connection flag (not shown) is set in the read VOBU data (YES in ST6424), the MPU 604 sets "read FP+read length" as the read FP, sets the MPEG decoder in a normal mode, appropriately reads and sets a system clock reference SCR, and resets the seamless connection flag (ST6426).

Upon completion of transfer that has started in ST6412 (YES in ST6428), it is checked if the next process is to start. If the next process is to start, the control enters a FIFO & read block control process (ST6445).

Figure 7:
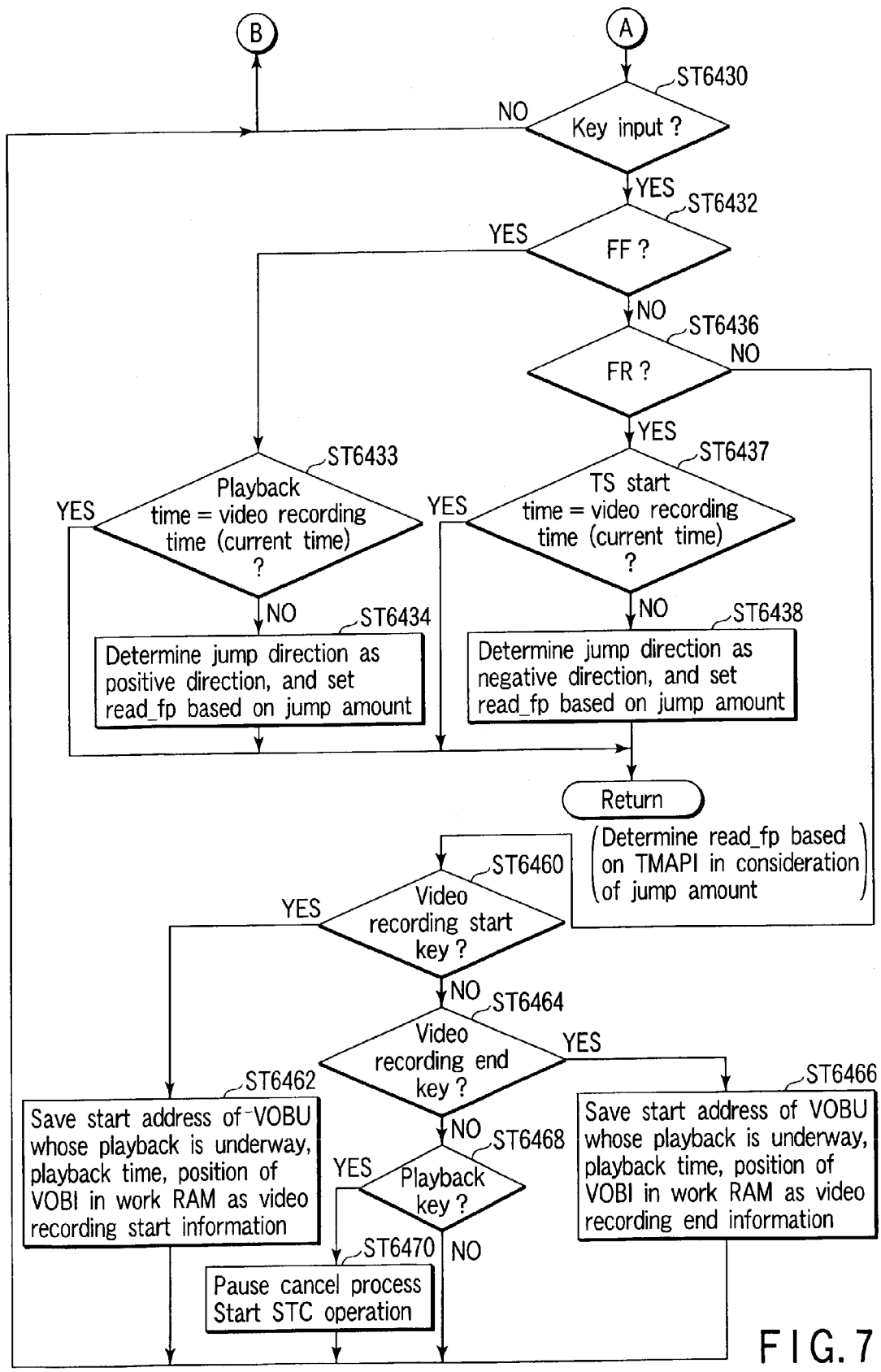
FIG. 7 is a flow chart for explaining the contents (part 2) of a process executed upon cell playback in the process shown in FIG. 5.

After the FIFO & read block control process (ST6445), if the remaining cell length becomes zero (YES in ST6450), since the cell has reached its end, the processes shown in FIGS. 6 and 7 end, and the control returns to ST650 in FIG. 5. If the remaining cell length is not zero (NO in ST6450), the flow returns to ST6402 to repeat the processes shown in FIGS. 6 and 7.

If transfer that has started in ST6412 is not complete (NO in ST6428), a key input is detected in ST20 in FIG. 2 (YES in ST6430 in FIG. 7), and a special playback mode is fast-forward (FF) (YES in ST6432), the MPU 604 compares the playback time with the video recording time (current time) (ST6433). If the playback time is different from the video recording time (NO in ST6433), the MPU 604 determines the jump direction of fast-forward as the positive direction, and sets a read position read_fp in accordance with a jump amount (ST6434). If the playback time matches the video recording time (YES in ST6433), the MPU 604 skips ST6434.

On the other hand, if the special playback mode is not FF but fast-reverse (FR) (NO in ST6432, YES in ST6436), the MPU 604 compares the start time with the video recording time (current time) (ST6437). If the start playback time is different from the video recording time (NO in ST6437), the MPU 604 determines the jump direction of fast-reverse as the negative direction, and sets a read position read_fp in accordance with a jump amount (ST6438). If the start time matches the video recording time (YES in ST6437), the MPU 604 skips ST6438.

After the read position read_fp upon FF or FR is set in this way, the MPU 604 executes a process for a read block (continuous data area CDA) upon special playback (FF or FR), and the control returns to ST650 in FIG. 5.

In the read block process, the read position read_fp can be determined based on the time map information TMAPI quoted in ST6400 in FIG. 6 in consideration of the jump amount (the contents of TMAPI will be explained later with reference to FIG. 8).

If no key input is detected (NO in ST6430) in the process of FIG. 7, the flow returns to ST6428 in FIG. 6. If a key input is detected and is neither the FF key nor the FR key (NO in ST6432, NO in ST6436), it is checked if the input key is a video recording start key (ST6460).

If the input key is a video recording start key (during the cell playback process) (YES in ST6460), the MPU 604 saves the start address of a VOBU whose playback is underway, playback time, VOBI position (in the work RAM 604a in FIG. 1) (in the work RAM 604a) as video recording start information (ST6462), and the flow returns to ST6428 in FIG. 6.

If the input key is not the video recording start key (NO in ST6460) but a video recording end key (YES in ST6464) during the playback process, the MPU 604 saves the start address of a VOBU whose playback is underway, playback time, VOBI position (in the work RAM 604a in FIG. 1) (in the work RAM 604a) as video recording end information (ST6462), and the flow returns to ST6428 in FIG. 6.

If the input key is neither the video recording start key (NO in ST6460) nor the video recording end key (NO in ST6464) during the playback process, but is a playback key (YES in ST6468), the MPU 604 cancels a pause state and starts the operation of the system time clock STC (ST6470). The flow then returns to ST6428 in FIG. 6.

If the input key is none of the video recording start key (NO in ST6460), video recording end key (NO in ST6464), and playback key (NO in ST6468) during the playback process, the flow directly returns to ST6428 in FIG. 6.

In the write control or read control with respect to the FIFO buffer in the FIFO unit 610a in FIG. 1, the following control is done while monitoring the FIFO remaining size to satisfy predetermined "FIFO conditions", so as to allow "playback while executing seamless recording".

(1) During Video Recording Process

If the FIFO buffer remaining size on the video recording side becomes equal to or larger than a predetermined value (e.g., 75%), a write size per access to the drive is increased (by each ECC block=16 or 32 sectors), the number of write accesses to the drive (per unit time) is increased, or the data size to be buffered in the recording FIFO is increased (by each ECC block). In this case, in order to prevent FIFO overflow, the write size per access to the drive is increased. In other words, the read size from this FIFO is increased.

(2) During Playback Process

If the remaining size of the FIFO buffer on the playback side becomes equal to or smaller than a predetermined value (e.g., 25%), the read size per access from the drive is increased (by each ECC block), or the number of read accesses (per unit time) is increased. In other words, the write size to this FIFO is increased.

(3) When Video Recording Process Overlaps Playback Process

The video recording process is preferentially done.

Note that the following two conditions can be adopted as the predetermined "FIFO conditions".

(A) Inhibit the video recording FIFO from overflowing.

(B) Inhibit the playback FIFO from being empty.

The input/output rate with respect to the FIFO buffer can have the following characteristics.

(a) The input rate of the video recording FIFO depends on the transfer rate (variable rate) from the MPEG encoder, and the output rate of the video recording FIFO depends on the transfer rate to the drive.

(b) The input rate of the playback FIFO depends on the transfer rate from the drive, and the output rate of the playback FIFO depends on the transfer rate to the decoder.

Figure 8:
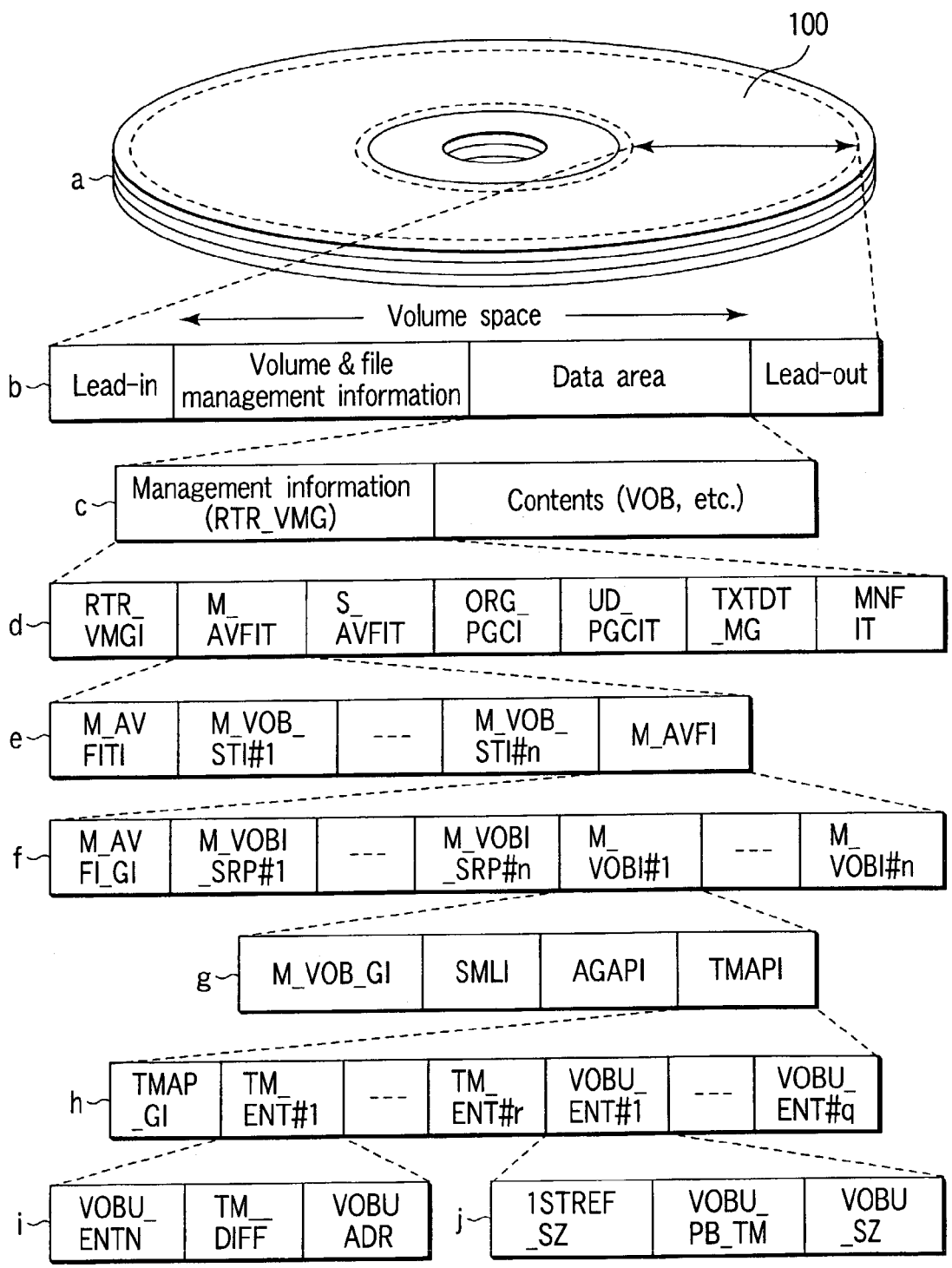
FIG. 8 is a view for explaining the contents of management information (RTR_VMG) recorded by the apparatus shown in FIG. 1.

FIG. 8 is a view for explaining the contents of the management information (RTR_VMG) recorded by the apparatus shown in FIG. 1. A case will be exemplified below wherein volume space information shown in the first column b in FIG. 8 is recorded in an information recording area of a DVD-RAM disk 100 in FIG. 8 (information to be recorded in the HDD unlit 700 can have the same data structure).

As shown in the first column b in FIG. 8, the volume space of the disk 100 contains a volume & file management information recording area, and a data area that records user data (AV information and the like). This data area can record management information RTR_VMG and the contents (video objects VOB and the like that form AV information) of user data, as shown in the second column c in FIG. 8. The management information RTR_VMG is stored as a file of a video manager VMG.

The management information RTR_VMG contains RTR video manager information RTR_VMGI, a movie AV file information table M_AVFIT, a still picture AV file information table S_AVFIT, original program chain information ORG_PGCI, a user-defined program chain information table UD_PGCIT, a text data manager TXTDT_MG, and manufacturer information MNFIT, as shown in the third column d in FIG. 8.

Note that the program chain information PGCI is a data structure which represents the whole playback control of a program chain PGC, which indicates a series of programs PG (program set). Each PG is a logical unit of the recording contents, and is recognized or defined by the user. The PG in the program set is formed of one or more original cells (playback unit of the first video recording contents), and is defined in only the ORG_PGCI. In other words, the ORG_PGCI is information that describes the cell playback order of the first video recording contents. Also, the UD_PCGIT is a table that describes one or more pieces of PGCI edited by the user after video recording.

The M_AVFIT contains movie AV file information table information M_AVFITI, one or more pieces of movie VOB stream information M_VOB_STI#1 to M_NVOB_STI#n, and movie AV file information M_AVFI, as shown in the fourth column e in FIG. 8. The M_AVFI contains movie AV file information general information M_AVFI_GI, one or more movie VOB information search pointers M_VOBI_SRP#1 to M_VOBI_SRP#n, and a plurality of pieces of movie VOB information M_VOBI#1 to M_VOBI#n corresponding in number to these search pointers, as shown in the fifth column f in FIG. 8.

Each M_VOBI# contains movie VOB general information M_VOBI_GI, seamless information SMLI, audio gap information AGAPI, and time map information TMAPI, as shown in the sixth column g in FIG. 8. This TMAPI is used upon executing special playback (e.g., cell playback in an order unique to each user using the user-defined PGC), and time search.

The TMAPI contains time map generation information TMAP_GI, one or more time entries TM_ENT#1 to TM_ENT#r, and one or more VOBU entries VOBU_ENT#1 to VOBU_ENT#q, as indicated by the seventh column h in FIG. 8.

Each TM_ENT contains VOBU_ENTN which indicates the number of the corresponding VOBU entry, TM_DIFF which indicates the time difference between the playback start time of VOBU designated by the time entry and the calculated playback time, and VOBU_ADR which indicates a target VOBU address, as shown in the left part i in the eighth column of FIG. 8. If a time unit TMU is expressed by 600 fields in NTSC (or if the time unit TMU is expressed by 500 fields in PAL), the "calculated playback time" for time entry #j can be given by $TMU \times (j-1) + TM\_OSF$. The VOBU_ADR expresses the target VOBU address by the total size of preceding VOBUs of the VOB of interest if the VOBU size is expressed by sectors.

In the above data structure, upon starting playback from the middle of a given VOBU, that access point must be settled. This access point is defined as a time entry point. This time entry point is separated the time difference indicated by time difference information TM_DIFF in the time entry TM_ENT from the position indicated by the VOBU movie address information. The time entry point serves as a special playback start point (or time search point) indicated by the time map information TMAPI.

Each VOBU entry contains reference picture size information 1STREF_SZ, VOBU playback time information VOBU_PB_TM, and VOBU size information VOBU_SZ, as shown in the right part j of the eighth column of FIG. 8. Note that the VOBU_PB_TM represents the playback time of the VOBU of interest by the number of video fields. Also, the reference picture size information 1STREF_SZ expresses the size of the first reference picture (corresponding to I-picture of MPEG) in the VOBU of interest by the number of sectors.

Normally, in the VOBU entry, the "VOBU time interval" is expressed by the number fields. As another method, the "VOBU time interval" can be expressed using a "count value of a clock counter from a given VOBU to the next VOBU". More specifically, the "VOBU time interval" can be expressed by the "difference between the value of a presentation time stamp PTS at the head position of one VOBU and that at the head position of the next VOBU". In other words, "the difference between clock counter values in a specific unit can represent the time interval in that unit".

The D-PRO unit 610 of the digital video recording/playback apparatus shown in FIG. 1 will be described in more detail below. The D-PRO unit 610 of the digital video recording/playback apparatus has:

(1) a microprocessor interface (address/data bus);

(2) a buffer memory controller;

(3) an ATA/ATAPI host interface;

(4) DMA controllers respectively for an ATA HDD and ATAPI DVD-RAM;

(5) an MPEG2 AV encoder interface; and (6) an AV decoder interface.

Figure 9:
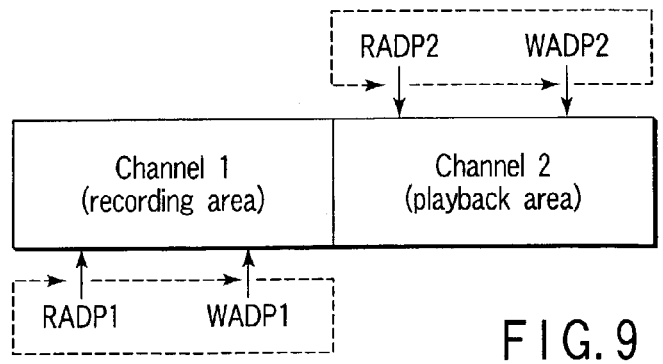
FIG. 9 is a view showing the relationship among a recording area and playback area in a FIFO unit, and respective pointers.

The FIFO unit 610*a* of the D-PRO unit 610 has channel 1 (recording area) and channel 2 (playback area), as shown in FIG. 9.

In the digital video recording/playback apparatus, the A/D unit 614 A/D-converts input video and audio signals, and the encoder unit 601 encodes the digital signals. Stream data with the DVD video recording format obtained by encoding is received via an MPEG2 AV encoder interface of a recorder data stream I/O control LSI (D-PRO unit 610), and is temporarily written in channel 1 of the FIFO unit 610*a*. Subsequently, the stream data read out from channel 1 is DMA-transferred on an ATA/ATAPI bus by the DMA controller of the D-PRO unit 610, and is recorded in the designated drive as one of the HDD unit 700 and disk drive unit 609.

Upon playback, stream data is read out from the designated one of the HDD unit 700 and disk drive 609. The readout stream data is DMA-transferred on the ATA/ATAPI bus by the DMA controller of the D-PRO unit 610, and is temporarily written in channel 2 of the FIFO unit 610*a*. The stream data read out from channel 2 is input to the decoder unit 602 via the AV decoder interface. After that, the stream data is decoded by the decoder unit 602, and the decoded data is D/A-converted by the D/A converter 632, and is output as output video and audio signals.

Respective registers of the D-PRO unit 610 will be explained below. Registers in the buffer memory controller which controls I/O of a 64 Mbit SDRAM, which is externally connected to the D-PRO unit 610, and registers in the DMA controller of the D-PRO unit 610 that implements data transfer with the ATA/ATAPI drive will be explained. These registers can undergo write or read access from the main MPU 604.

The registers in the buffer memory controller will be explained first.

RADP1/RADP2 registers (Read Address Pointer)

RADP1/RADP2 registers designate read pointers of the FIFO unit 610*a* assigned to channels 1 and 2 of the FIFO unit 610*a*. These registers can undergo write or read access from the main MPU 604.

The RADP1 register is used to set a read pointer for channel 1, and the RADP2 register is used to set a read pointer for channel 2. Each register returns the current address pointer upon reading out data. When stream data is read out from the FIFO unit 610*a* to the AV decoder interface or DMA transfer controller, the address increases. If each address pointer has reached the end address of channel 1 or 2, it goes back to the start address of the corresponding channel by passing through the area in that channel. RADP1 can catch up with WADP1 but cannot overtake it. When RADP1 has caught up WADP1, channel 1 becomes empty. The same applies to the relationship between RADP2 and WADP2.

WADP1/WADP2 registers (Write Address Pointer)

WADP1/WADP2 registers are used to set write pointers assigned to channels 1 and 2 of the FIFO unit 610*a*. These registers can undergo write or read access from the main MPU 604. The WADP1 register is used to set a write pointer for channel 1, and the WADP2 register is used to set a write pointer for channel 2. Upon reading out data, each register returns the current address pointer. When stream data is written from the MPEG2 AV encoder interface or DMA transfer controller, the address increases. If each address pointer has reached the end address of channel 1 or 2, it goes back to the start address of the corresponding channel by taking a tour of the area in that channel. WADP1 can catch up RADP1 but cannot overtake it. When WADP1 has caught up RADP1, channel 1 becomes full of data. The same applies to the relationship between RADP2 and WADP2.

Next, registers in the DMA controller of the D-PRO unit that implements data transfer with the ATA/ATAPI drive will be explained. When the digital video recording/playback apparatus has two drives, as shown in FIG. 1, two DMA controllers are prepared in correspondence with an ATA HDD and ATAPI DVD-PAM. In this case, each DMA controller has a set of the following registers.

LENGTH Register

A LENGTH register is used to set the length of one block to be transferred with the ATA HDD or ATAPI DVD-RAM drive by the number of words (2 bytes). For example, for the DVD format, since one block (=sector) is specified by 2048 bytes, 0×400 (=1024) is set. For the HDD, since one sector is specified by 512 bytes, the same value 0×400 is set to have 1 block=4 sectors in correspondence with the DVD format.

NBLOCK Register

An NBLOCK register is used to set the total number of data blocks to be transferred with the ATA HDD or ATAPI DVD-RAM drive by one transfer command operation. For example, if 0×100 is set, 256 sectors can be transferred. This register returns the number of remaining blocks to be transferred if it undergoes read access. The contents of this register are decremented every time transfer of one block is complete.

DMACTL Register

"DIR" at the LSB position indicates a DMA transfer direction. If DIR=1, it indicates a direction ATA/ATAPI drive→D-PRO; if DIR=0, it indicates a direction D-PRO→ATA/ATAPI drive.

"START" at the MSB position is a register that starts one DMA transfer in response to one-shot write access.

The main MPU 604 can detect the number of remaining blocks of the last DMA transfer by reading the NBLOCK register when the FIFO unit 610*a* becomes empty upon stopping video recording. The total number of sectors upon video recording is settled based on this value.

The recording stop process will be explained below with reference to FIGS. 10 and 11.

Figure 10:
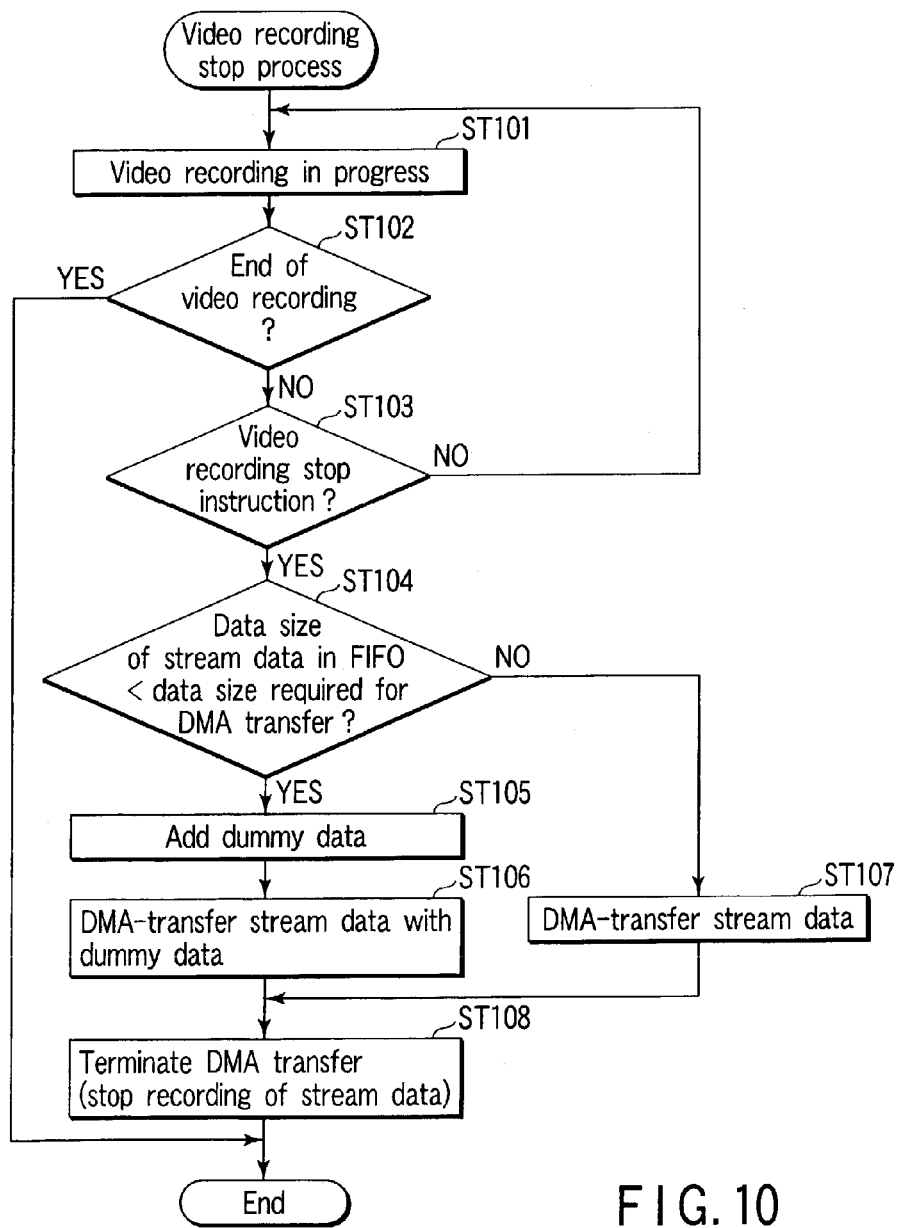
FIG. 10 is a flow chart for explaining a video recording stop process.

FIG. 10 is a flow chart for explaining the recording stop process. Note that the recording stop process is controlled by the main MPU 604.

Stream data, which is provided in response to a recording instruction input via the key input unit 607, is stored in channel 1 of the FIFO unit 610*a*. The stream data stored in channel 1 of the FIFO unit 610*a* is DMA-transferred for each predetermined data size, and is recorded in, e.g., the HDD unit 700 (ST101). In other words, if data stored in the FIFO unit is of a smaller quantity than the predetermined data size, DMA transfer cannot start.

During the above recording process (NO in ST102), if a video recording stop instruction is input via the key input unit 607 (YES in ST103), and the size of stream data stored in channel 1 of the FIFO unit 610*a* is smaller than the data size required for Dry transfer (YES in ST104), dummy data is added to the stream data stored in channel 1 of the FIFO unit 610*a* (ST105), and the stream data with the dummy data, whose data size has reached the predetermined data size, is DMA-transferred (ST106). In this way, DMA transfer is terminated (ST108), and recording of stream data is consequently stopped.

The termination process of DMA transfer will be supplemented below. The FIFO unit 610*a* has a recording area (channel 1) and playback area (channel 2), as shown in FIG. 9, and the write state of stream data in the recording area is managed by a first write address pointer (WADP1). Also, the read state of stream data from the recording area is managed by a first read address pointer (RADP1). The write state of stream data in the playback area is managed by a second write address pointer (WADP2). Furthermore, the read state of stream data from the playback area is managed by a second read address pointer (RADP2). When the first read address pointer has caught up the first write address pointer, and a free space of the recording area is detected, the first write address pointer is set at a position outside the area, i.e., at the end of the playback area, thus terminating DMA transfer.

Figure 11:
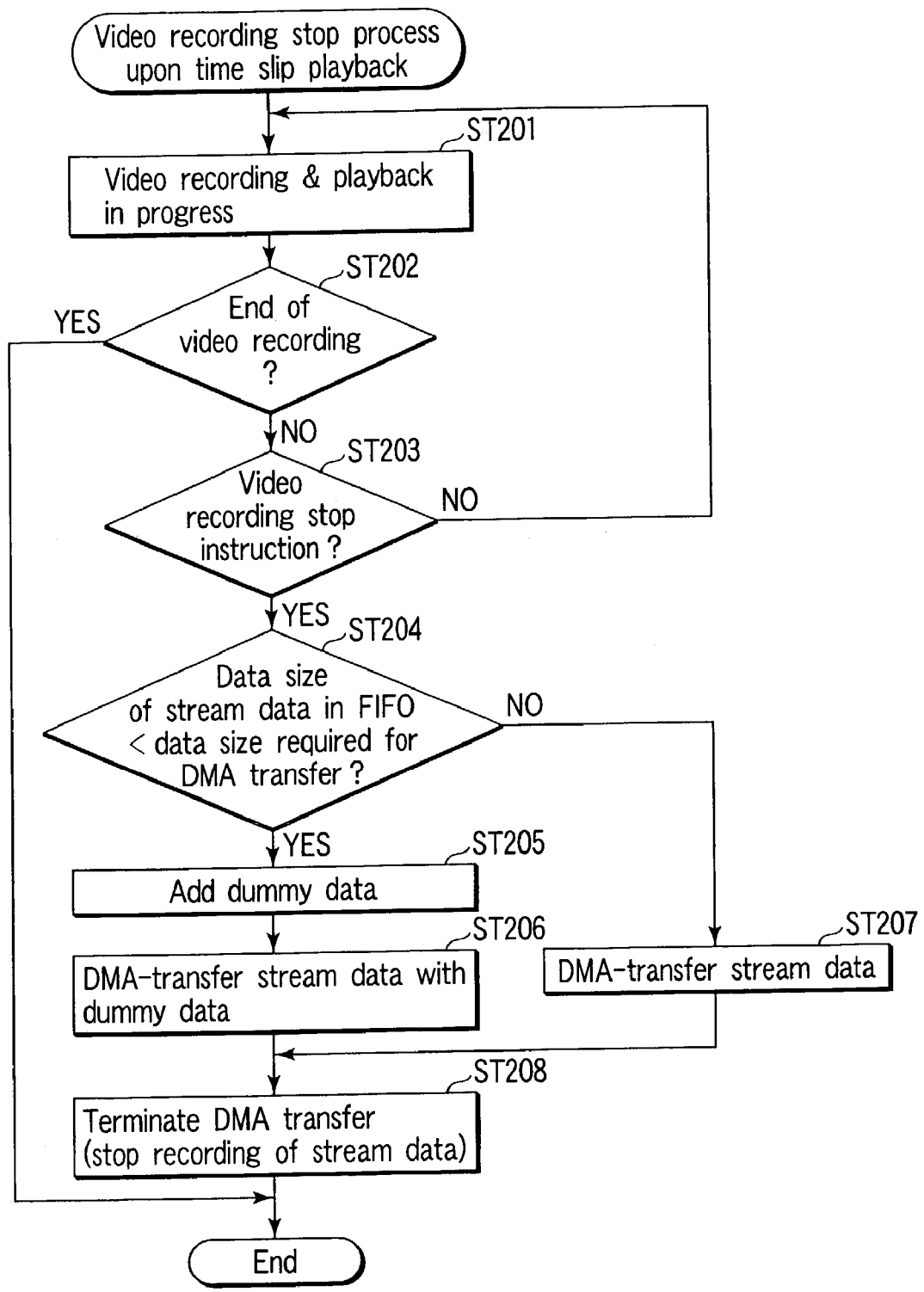
FIG. 11 is a flow chart for explaining a video recording process upon time slip playback.

FIG. 11 is a flow chart for explaining the video recording stop process upon time slip playback. Note that the video recording stop process is controlled by the main MPU 604.

Assume that video recording and playback operations are executed in parallel, as follows (ST201). That is, stream data, which is provided in response to a recording instruction input via the key input unit 607, is stored in channel 1 of the FIFO unit 610a. The stream data stored in channel 1 of the FIFO unit 610a is DMA-transferred for each predetermined data size, and is recorded in, e.g., the HDD unit 700. During this recording operation, stream data, which is provided from the HDD unit 700 in response to a playback instruction input via the key input unit 607, is stored in channel 2 of the FIFO unit 610a. The stream data stored in channel 2 of the FIFO unit 610a is played back and output. By parallelly executing the video recording and playback operations, as described above, the program, which is currently being recorded, can also be played back (time slip playback).

During the aforementioned video recording & playback operations (NO in ST202), if a video recording stop instruction is input via the key input unit 607 (YES in ST203), and the data size of stream data stored in channel 1 of the FIFO unit 610a is smaller than that required for DMA transfer (YES in ST204), dummy data is added to the stream data stored in channel 1 of the FIFO unit 610a (ST205), and the stream data with the dummy data, whose data size has reached the predetermined data size, is DMA-transferred (ST206). In this way, DMA transfer is terminated (ST208), and recording of stream data is consequently stopped.

The termination process of DMA transfer will be supplemented below. The FIFO unit 610a has a recording area (channel 1) and playback area (channel 2), as shown in FIG. 9, and the write state of stream data in the recording area is managed by a first write address pointer (WADP1). Also, the read state of stream data from the recording area is managed by a first read address pointer (RADP1). The write state of stream data in the playback area is managed by a second write address pointer (WADP2). Furthermore, the read state of stream data from the playback area is managed by a second read address pointer (RADP2). When the first read address pointer has caught up the first write address pointer, and a free space of the recording area is detected, the first write address pointer is set at a position outside the area, i.e., at the end of the playback area, thus terminating DMA transfer.

Upon completion of output of stream data from the encoder unit 601 in response to a video recording stop instruction, if data stored in the FIFO unit 610a is deficient, DMA transfer cannot be terminated. Hence, dummy data corresponding to a deficient size is added to data stored in the FIFO unit 610a to terminate DMA transfer. That is, DMA transfer need not be reset, and a high-speed video recording stop process can be implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording stop processing method for stopping recording in response to a recording stop instruction, comprising:

when storing stream data in response to a recording instruction input in a recording area executing Direct Memory Access (DMA) transfer the stored stream data for each predetermined data size, and recording the DMA-transferred stream data in a predetermined recording destination, terminating the DMA transfer of the stored stream data for each predetermined data size, when a recording stop instruction is input, and a data size of the stream data stored in the recording area at that time is smaller than the predetermined data size, by adding dummy data to the stream data stored in the recording area and DMA-transferring the stream data with the dummy data, the data size of which becomes equal to the predetermined data size, thereby stopping recording of stream data.

2. A method according to claim 1, further comprising:

managing a write state of stream data in the recording area by a write address pointer and a read state of stream data from the recording area by a read address pointer, and when the read address pointer has caught up the write address pointer to detect a free space of the recording area, setting the write address pointer at a position outside the recording area to terminate DMA transfer.

3. A method according to claim 1, wherein a predetermined area includes the recording area and a playback area, and the method further comprising:

managing a write state of stream data in the recording area by a first write address pointer, managing a read state of stream data from the recording area by a first read address pointer, managing a write state of stream data in the playback area by a second write address pointer, managing a read state of stream data from the playback area by a second read address pointer, and when the first read address pointer has caught up the first write address pointer to detect a free space of the recording area, setting the first write address pointer at an end of the playback area to terminate DMA transfer.

4. A method according to claim 1, wherein a predetermined area includes the recording area and a playback area, and the method further comprising:

in a playback operation, storing stream data, which is read from the recording destination in response to a playback instruction, in the playback area via DMA transfer, and externally playing back and outputting the stored stream data, and when the recording operation and the playback operation are alternately executed, if a recording stop instruction is input, and a data size of the stream data stored in the recording area at that time is smaller than the predetermined data size, terminating DMA transfer by adding dummy data to the stream data stored in the recording area, and DMA-transferring the stream data with the dummy data, the data size of which becomes equal to the predetermined data size, thereby stopping recording of stream data.

5. A method according to claim 4, further comprising:

managing a write state of stream data in the recording area by a first write address pointer;

managing a read state of stream data from the recording area by a first read address pointer, and when the first read address pointer has caught up the first write address pointer to detect a free space of the recording area, setting the first write address pointer at a position outside the recording area to terminate DMA transfer.

6. A method according to claim 4, further comprising:

managing a write state of stream data in the recording area by a first write address pointer, managing a read state of stream data in the recording area by a first read address pointer, managing a write state of stream data in the playback area by a second write address pointer, managing a read state of stream data in the playback area by a second read address painter, and when the first read address pointer has caught up the first write address pointer to detect a free space of the recording area, setting the first write address pointer at an end of the playback area to terminate DMA transfer.

7. A data recording apparatus comprising:

a storage unit configured to store stream data, which is provided in response to a recording instruction, in a recording area;

a transfer unit configured to DMA-transfer the stream data stored in the recording area for each predetermined data size;

a recording unit configured to record the stream data, which is DMA-transferred by the transfer unit, in a predetermined recording destination; and a control unit configured to terminate, when a recording stop instruction is input while stream data is recorded by the recording unit, and a data size of the stream data stored in the recording area is smaller than the predetermined data size, DMA transfer by adding dummy data to the stream data stored in the recording area, and DMA-transferring the stream data with the dummy data, the data size of which becomes equal to the predetermined data size, thereby stopping recording of stream data.

8. An apparatus according to claim 7, wherein the storage unit includes the recording area, and a write state of stream data in the recording area is managed by a write address pointer, a read state of stream data from the recording area is managed by a read address pointer, and when the read address pointer has caught up the write address pointer to detect a free space of the recording area, the write address pointer is set at a position outside the recording area to terminate DMA transfer.

9. An apparatus according to claim 7, wherein the storage unit includes the recording area and a playback area, and a write state of stream data in the recording area is managed by a first write address pointer, a read state of stream data from the recording area is managed by a first read address pointer, a write state of stream data in the playback area is managed by a second write address pointer, a read state of stream data from the playback area is managed by a second read address pointer, and when the first read address pointer has caught up the first write address pointer to detect a free space of the recording area, the first write address pointer is set at an end of the playback area to terminate DMA transfer.

10. An apparatus according to claim 7, further comprising a playback unit configured to read out stream data from the recording destination in response to a playback instruction, stores the readout stream data in a playback area, and plays back the stored stream data, and wherein the storage unit includes the recording area and a playback area, the transfer unit DMA-transfers stream data for the predetermined data size to the playback area in response to read access of stream data by the playback unit, and when a recording operation of the recording unit and a play back operation of the playback unit are parallelly executed, if a recording stop instruction is input, and a data size of the stream data stored in the recording area at that time is smaller than the predetermined data size, the control unit terminates DMA transfer by adding dummy data to the stream data stored in the recording area, and DMA-transferring the stream data with the dummy data, the data size of which becomes equal to the predetermined data size, thereby stopping recording of stream data.

11. An apparatus according to claim 10, wherein a write state of stream data in the recording area is managed by a write address pointer, a read state of stream data from the recording area is managed by a read address pointer, and when the read address pointer has caught up the write address pointer to detect a free space of the recording area, the write address pointer is set at a position outside the recording area to terminate DMA transfer.

12. An apparatus according to claim 10, wherein a write state of stream data in the recording area is managed by a first write address pointer, a read state of stream data from the recording area is managed by a first read address pointer, a write state of stream data in the playback area is managed by a second write address pointer, a read state of stream data from the playback area is managed by a second read address pointer, and when the first read address pointer has caught up the first write address pointer to detect a free space of the recording area, the first write address pointer is set at an end of the playback area to terminate DMA transfer.

* * * * *